(12) United States Patent
Tsou et al.

(10) Patent No.: US 11,425,094 B2
(45) Date of Patent: Aug. 23, 2022

(54) ABNORMAL PACKET DETECTION APPARATUS AND METHOD

(71) Applicant: Institute For Information Industry, Taipei (TW)

(72) Inventors: Yu-Ting Tsou, Taipei (TW); Ding-Jie Huang, Taipei (TW); Chih-Ta Lin, Taipei (TW); Ming-Hsuan Yang, Taipei (TW); Mei-Lin Li, Taipei (TW); Saranchon Lammongkol, Taipei (TW); Chin-Fang Mao, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 145 days.

(21) Appl. No.: 17/102,209

(22) Filed: Nov. 23, 2020

(65) Prior Publication Data

US 2022/0131833 A1    Apr. 28, 2022

(30) Foreign Application Priority Data

Oct. 27, 2020    (TW) .................................. 109137275

(51) Int. Cl.
*G06F 15/18* (2006.01)
*H04L 9/40* (2022.01)
(Continued)

(52) U.S. Cl.
CPC .......... *H04L 63/0236* (2013.01); *H04L 43/04* (2013.01); *H04L 43/062* (2013.01); *H04L 43/50* (2013.01); *H04L 63/1425* (2013.01)

(58) Field of Classification Search
CPC ....... H04L 43/04; H04L 43/062; H04L 43/50; H04L 63/0236; H04L 63/1425
See application file for complete search history.

(56) References Cited

U.S. PATENT DOCUMENTS

| 2011/0131655 | A1* | 6/2011 | Singh | ................. H04L 63/1416 |
| | | | | 707/E17.044 |
| 2017/0163670 | A1* | 6/2017 | Manadhata | ......... H04L 61/4511 |
| 2019/0190930 | A1* | 6/2019 | Miron | ..................... H04L 69/22 |

FOREIGN PATENT DOCUMENTS

| CN | 105141604 A | 12/2015 |
| CN | 108737447 B | 7/2020 |

OTHER PUBLICATIONS

Office Action to the corresponding Taiwan Patent Application rendered by the Taiwan Intellectual Property Office (TIPO) on Apr. 29, 2021, 18 pages (including English translation).

* cited by examiner

*Primary Examiner* — Anh Nguyen
(74) *Attorney, Agent, or Firm* — Li & Cai Intellectual Property Office (57) ABSTRACT

An abnormal packet detection apparatus and method are provided. The abnormal packet detection apparatus stores a whitelist corresponding to a protocol port, wherein the whitelist includes at least one legal packet record. Each legal packet record includes a legal packet length, a legal source address, and a legal variation position set, and corresponds to a reference packet. The abnormal packet detection apparatus determines that a current packet length and a current source address of a to-be-analyzed packet are respectively the same as the legal packet length and the legal source address of a reference packet record among the at least one legal packet record, determines a current variation position of the to-be-analyzed packet by comparing the to-be-analyzed packet with the reference packet corresponding to the reference packet record, and generates a detection result by comparing the current variation position with the legal variation position set of the reference packet record.

20 Claims, 7 Drawing Sheets

(51) Int. Cl.
*H04L 43/50* (2022.01)
*H04L 43/062* (2022.01)
*H04L 43/04* (2022.01)

FIG. 1A

| Legal packet length | Legal source address | Legal variation position set | Legal occurrence value set |
|---|---|---|---|
| 56 | 192.168.10.105_00:1d:09:99:b2:2c | {49, 54} | 49: {115, 139}<br>54: {9, 10, 5, 8} |
| ...... | ...... | ...... | ...... |
| 64 | 192.168.10.105_00:1d:09:99:b2:2c | {57, 58, 59, 60, 61} | 57: {50, 88}<br>58: {92, 114}<br>59: {34, 255}<br>60: {8, 243}<br>61: {89, 90} |

FIG. 1B

| Historical packet length | count | Historical source address | Historical variation position | Historical occurrence value |
|---|---|---|---|---|
| 56 | 92 | 192.168.10.105_00:1d:09:99:b2:2c<br>192.168.10.120_00:00:bc:3e:eb:e4 | 44, 45, 46, 49, 54 | 44: {9, 10, 172, 43, 92}<br>45: {150, 151, 152, 153, 154, ...}<br>46: {8, 7}<br>49: {115, 139}<br>54: {9, 10, 5, 8} |
| ...... | ...... | ...... | ...... | ...... |
| 64 | 1 | 192.168.10.105_00:1d:09:99:b2:2c | 44, 57, 58, 59, 60, 61 | 44: {12, 14, 122, 13, 42}<br>57: {50, 88}<br>58: {92, 114}<br>59: {34, 255}<br>60: {8, 243}<br>61: {89, 90} |

24a (first data row), 24b (last data row)

FIG. 1C

| Historical packet length | count | Historical source address | Historical variation position | Historical occurrence value |
|---|---|---|---|---|
| 56 | 92 | 192.168.10.105_00:1d:09:99:b2:2c<br>192.168.10.120_00:00:bc:3e:eb:e4 | 49, 54 | 49: {115, 139}<br>54: {9, 10, 5, 8} |
| ...... | ...... | ...... | ...... | ...... |
| 64 | 1 | 192.168.10.105_00:1d:09:99:b2:2c | 57, 58, 59,<br>60, 61 | 57: {50, 88}<br>58: {92, 114}<br>59: {34, 255}<br>60: {8, 243}<br>61: {89, 90} |

ABNORMAL PACKET DETECTION APPARATUS AND METHOD

PRIORITY

This application claims priority to Taiwan Patent Application No. 109137275 filed on Oct. 27, 2020, which is hereby incorporated by reference in its entirety.

FIELD

The present invention relates to an abnormal packet detection apparatus and method. Specifically, the present invention relates to an apparatus and method which establish a whitelist for each different communication protocol individually and perform abnormal packet detection accordingly.

BACKGROUND

In the era of Internet of Everything, devices such as national infrastructures and operating equipments of manufacturing industry are networked and are managed and controlled by the industrial control system. If the industrial control environment (that is, the network environment where the industrial control system and the infrastructures or/and operating equipments controlled by the industrial control system are located) suffers from information security attack (for example, the intrusion of malicious software), it will cause countless or even irreparable losses. Therefore, an intrusion detection system must be installed in the industrial control environment to monitor whether the industrial control environment operates normally in time or/and instantly.

Communication protocols used in the industrial control system (which is referred to as "industrial control protocols" hereinafter) must comply with an Open System Interconnection (OSI) model. The conventional intrusion detection system mainly detects packet contents of Layer 2 and Layers 5 to 7 of the industrial control protocols. If there are different industrial control protocols, users must understand these different industrial control protocols and then generate corresponding protocol analysis modules for the different industrial control protocols so that the intrusion detection system can operate accordingly. Conventional intrusion detection systems cannot perform reverse processing when encountering unknown industrial control protocols, which leads to many misjudgments.

Accordingly, a technology that can analyze characteristics of unknown communication protocols (e.g., unknown industrial control protocols) in a non-artificial way and detect attack events (e.g., intrusion of malicious software) in the network environment in time is in an urgent need.

SUMMARY

To solve the above technical problems, the present invention in certain embodiments provides an abnormal packet detection apparatus and method, which can analyze characteristics of unknown communication protocols in a non-artificial way and detect attack events in the network environment in time.

The abnormal packet detection apparatus in certain embodiments may comprise a storage, a transceiving interface, and a processor, wherein the processor is electrically connected to the storage and the transceiving interface. The storage stores a whitelist corresponding to a protocol port, and the whitelist comprises at least one legal packet record. Each of the at least one legal packet record comprises a legal packet length, a legal source address, and a legal variation position set. Each of the at least one legal packet record corresponds to a reference packet. The transceiving interface receives a to-be-analyzed packet of the protocol port. The processor determines that a current packet length and a current source address of the to-be-analyzed packet are respectively the same as the legal packet length and the source address comprised in a reference packet record among the at least one legal packet record. The processor determines a current variation position of the to-be-analyzed packet by comparing the to-be-analyzed packet with the reference packet corresponding to the reference packet record. The processor generates a first detection result by comparing the current variation position with the legal variation position set comprised in the reference packet record.

For some abnormal packet detection apparatuses, the legal variation position set comprised in each of the at least one legal packet record included in the whitelist comprises at least one byte position. The first detection result may be the current variation position being not one of the at least one byte position comprised in the legal variation position set included in the reference packet record. The transceiving interface further transmits an alarm signal.

For some abnormal packet detection apparatuses, the legal variation position set comprised in each of the at least one legal packet record included in the whitelist comprises at least one byte position, and each of the at least one byte position corresponds to a legal occurrence value set. The first detection result may be the current variation position being one of the at least one byte position comprised in the legal variation position set included in the reference packet record. The processor further finds out a reference occurrence value set from the at least one legal occurrence value set according to the current variation position, and the processor further generates a second detection result by comparing a current occurrence value of the to-be-analyzed packet at the current variation position with the reference occurrence value set.

The abnormal packet detection method in certain embodiments may be adapted for use in an electronic computing apparatus. The electronic computing apparatus stores a whitelist corresponding to a protocol port, and the whitelist comprises at least one legal packet record. Each of the at least one legal packet record comprises a legal packet length, a legal source address, and a legal variation position set. Each of the at least one legal packet record corresponds to a reference packet. The abnormal packet detection method comprises the following steps: (a) receiving a to-be-analyzed packet of the protocol port, (b) determining that a current packet length and a current source address of the to-be-analyzed packet are respectively the same as the legal packet length and the source address included in a reference packet record among the at least one legal packet record, (c) determining a current variation position of the to-be-analyzed packet by comparing the to-be-analyzed packet with the reference packet corresponding to the reference packet record; and (d) generating a first detection result by comparing the current variation position with the legal variation position set comprised in the reference packet record.

For some abnormal packet detection methods, the legal variation position set comprised in each of the at least one legal packet record included in the whitelist comprises at least one byte position. The first detection result may be the current variation position being not one of the at least one byte position comprised in the legal variation position set included in the reference packet record. The abnormal packet detection method further comprises a step of transmitting an alarm signal.

For some abnormal packet detection methods, the legal variation position set comprised in each of the at least one legal packet record included in the whitelist comprises at least one byte position. Each of the at least one byte position corresponds to a legal occurrence value set. The first detection result may be the current variation position being one of the at least one byte position comprised in the legal variation position set included in the reference packet record. The abnormal packet detection method further comprises a step of finding out a reference occurrence value set from the at least one legal occurrence value set according to the current variation position and a step of generating a second detection result by comparing a current occurrence value of the first to-be-analyzed packet at the current variation position with the reference occurrence value set to generate a second detection result.

The abnormal packet detection technology (at least including the apparatus and the method) provided according to the present invention may perform statistical analysis on historical packets of different protocol ports to generate whitelists of different protocol ports. Specifically, the whitelist of a protocol port comprises at least one legal packet record, wherein each of the at least one legal packet record comprises a legal packet length, a legal source address, and a legal variation position set, and each of the at least one legal packet record corresponds to a reference packet. In addition, the legal variation position set comprised in each of the at least one legal packet record included in the whitelist of a protocol port may comprise at least one byte position, and each of the at least one byte position corresponds to a legal occurrence value set. After receiving a to-be-analyzed packet of a certain protocol port, the abnormal packet detection technology provided by the present invention may compare the to-be-analyzed packet with the whitelist of the protocol port and thereby determine whether the to-be-analyzed packet is abnormal from aspects such as the packet length, the source address, and the variation position, and even from the aspect of the occurrence value of the variation position.

The abnormal packet detection technology provided according to the present invention performs statistical analysis on historical packets of different protocol ports to generate whitelists of different protocol ports. Since different communication protocols use different protocol ports, it means that the abnormal packet detection technology provided according to the present invention performs statistical analysis on historical packets of different communication protocols to generate whitelists of different communication protocols. Therefore, by adopting the abnormal packet detection technology provided by the present invention, users do not need to understand the contents of different communication protocols. Even if there are unknown communication protocols, the abnormal packet detection technology provided according to the present invention can still generate corresponding whitelists to detect attack events in the network environment in time or/and instantly.

The detailed technology and preferred embodiments implemented for the subject invention are described in the following paragraphs accompanying the appended drawings for a person having ordinary skill in the art to well appreciate the features of the claimed invention.

DETAILED DESCRIPTION

In the following description, an abnormal packet detection apparatus and method provided according to the present invention will be explained with reference to example embodiments thereof. However, these example embodiments are not intended to limit the present invention to any environment, applications, or implementations described in these example embodiments. Therefore, description of these example embodiments is only for purpose of illustration of the present invention rather than to limit the scope of the present invention.

It shall be appreciated that, in the following embodiments and the attached drawings, elements unrelated to the present invention are omitted from depiction. In addition, dimensions of elements and dimensional proportions among individual elements in the attached drawings are provided only for ease of depiction and illustration, but not to limit the scope of the present invention.

Figure 1A:
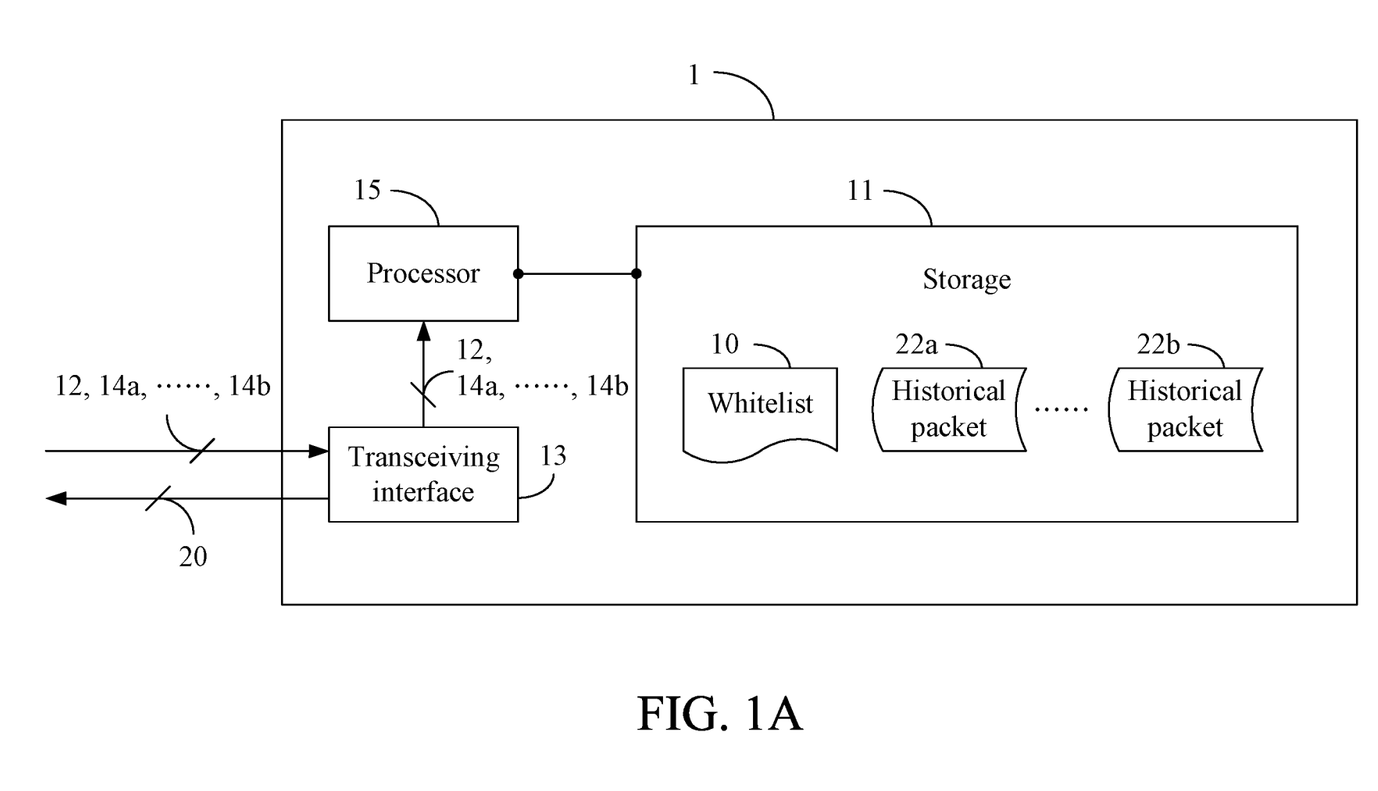
FIG. 1A depicts a schematic view of the abnormal packet detection apparatus 1.

A first embodiment of the present invention is an abnormal packet detection apparatus 1, and a schematic view thereof is depicted in FIG. 1A. The abnormal packet detection apparatus 1 comprises a storage 11, a transceiving interface 13, and a processor 15, wherein the processor 15 is electrically connected to the storage 11 and the transceiving interface 13. The storage 11 may be a memory, a universal serial bus (USB) disk, a hard disk, a compact disk (CD), a digital versatile disc (DVD), a hard disk drive (HDD), or any other non-transitory storage media or apparatuses with the same functions and well-known to a person having ordinary skill in the art. The transceiving interface 13 may be a wired transmission interface or a wireless transmission interface known to a person having ordinary skill in the art, which is used to be connected to a network (e.g., an Internet, a local area network) and may receive and transmit signal and data on the network. The processor 15 may be one of various processors, central processing units (CPUs), microprocessor units (MPUs), digital signal processors (DSPs), or other computing apparatuses well known to a person having ordinary skill in the art.

The abnormal packet detection apparatus 1 may be installed in a network environment, and the network environment may comprise a plurality of networked equipments. For example, the abnormal packet detection apparatus 1 may be installed in an industrial control environment, and the industrial control environment comprises a plurality of operating equipments, such as a human machine interface (HMI), and a programmable logic controller (PLC). In this network environment, the networked equipments may communicate with each other by using one or more communication protocols.

In this embodiment, the storage 11 stores a whitelist 10, and the whitelist 10 corresponds to a protocol port (for example, a protocol port using a port number of 44818). Since different communication protocols use different protocol ports, it is understood that the whitelist 10 corresponds to a certain communication protocol. It shall be noted that the number of whitelists stored in the storage 11 is not limited in the present invention. In other words, the storage 11 may also store a plurality of whitelists, and different whitelists correspond to different protocol ports (that is, different whitelists correspond to different communication protocols).

Figure 1B:
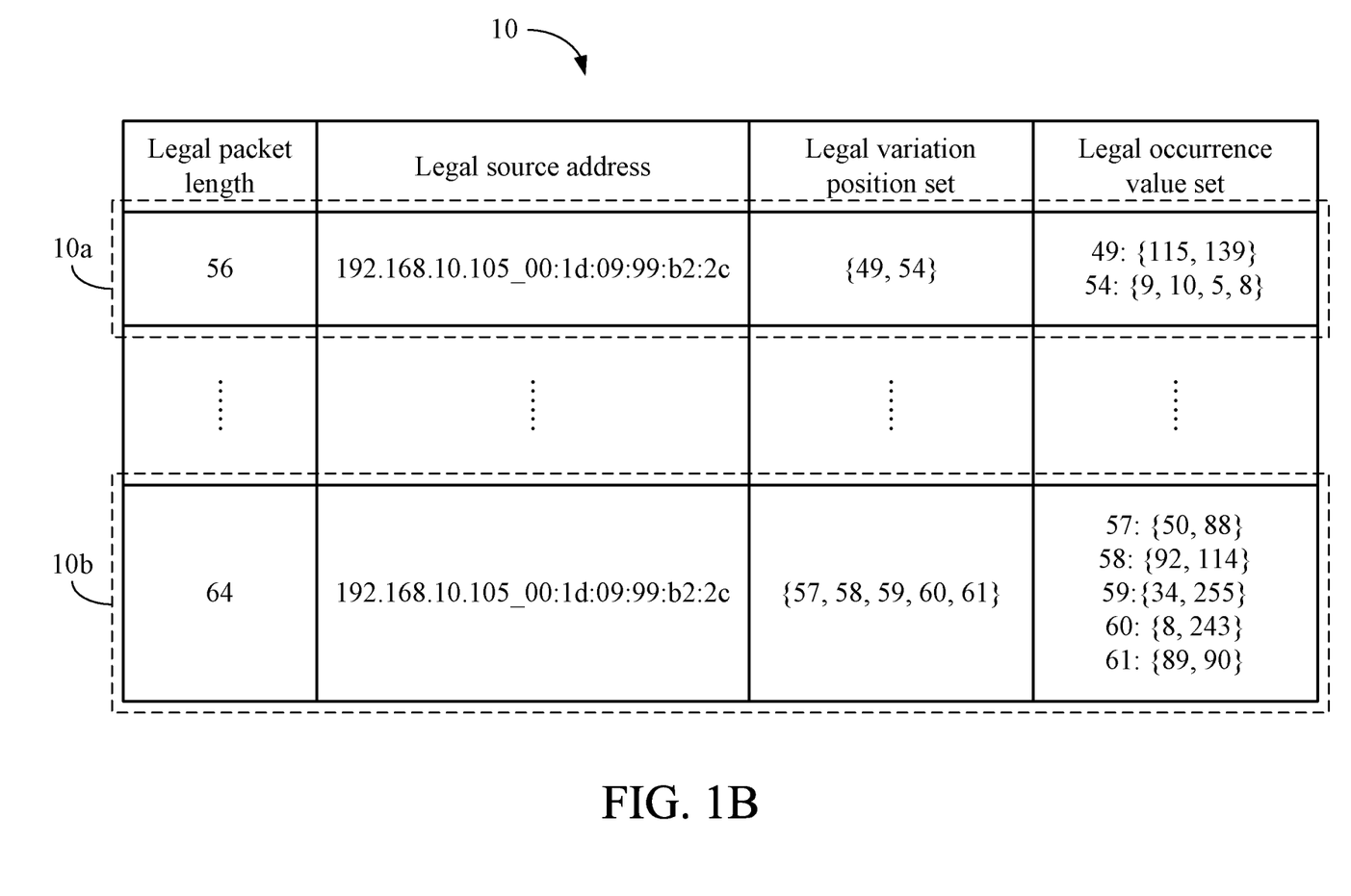
FIG. 1B depicts a specific example of a whitelist 10.

Please refer to a specific example of the whitelist 10 shown in FIG. 1B. This specific example will be used in the subsequent description, but it is not intended to limit the scope of the present invention. The whitelist 10 comprises a plurality of legal packet records 10a, 10b. Each of the legal packet records 10a, . . . , 10b comprises a legal packet length, a legal source address, a legal variation position set, and at least one legal occurrence value set. Each of the legal packet records 10a, . . . , 10b corresponds to a reference packet (not shown). Since the corresponding legal packet record of each of the reference packets comprises a legal packet length, each of the reference packets serves as a comparison benchmark for packets with the same packet length (to be described later). It shall be noted that the present invention does not limit the number of legal packet records comprised in a whitelist. That is, the number of legal packet records may be one or more. In addition, in some embodiments, it is feasible that each legal packet record comprised in a whitelist comprise no legal occurrence value set.

In this embodiment, the legal source address comprised in each of the legal packet records 10a, . . . , 10b comprises an Internet address and a media access control address. In other embodiments, the abnormal packet detection apparatus 1 may adopt other addresses that can identify different networked equipments in a network environment as a legal source address. In addition, the legal variation position set comprised in each of the legal packet records 10a, . . . , 10b comprises at least one byte position (i.e., a byte position of which the value is variable), and each of the at least one byte position corresponds to a legal occurrence value set (i.e., values considered as legal at a certain byte position). For example, the legal variation position set of the legal packet record 10a comprises two byte positions (i.e., the $49^{th}$ byte position and the $54^{th}$ byte position), which means that the packet with a packet length of 56 bytes is variable at the two byte positions. In addition, each of the two byte positions comprised in the legal variation position set of the legal packet record 10a corresponds to a legal occurrence value set (i.e., the $49^{th}$ byte position corresponds to a legal occurrence value set $\{115, 139\}$, and the $54^{th}$ byte position corresponds to a legal occurrence value set $\{9, 10, 5, 8\}$), which means that values of a packet with the packet length of 56 bytes that may occur at the $49^{th}$ byte position are 115 and 139, and the values of a packet with the packet length of 56 bytes that may occur at the $54^{th}$ byte position are 5, 8, 9, and 10.

The abnormal packet detection apparatus 1 may monitor all packets in the network environment through a mirror port of a switch or a hub in the network environment, and the transceiving interface 13 may receive all the monitored packets. The abnormal packet detection apparatus 1 may use the whitelist 10 to determine whether any monitored packet is abnormal. Herein, it is assumed that the transceiving interface 13 receives a to-be-analyzed packet 12 (that is, one of the monitored packets). The processor 15 determines that the to-be-analyzed packet 12 corresponds to a certain protocol port by reading the port number (e.g., 44818) comprised in the to-be-analyzed packet 12 and then compares the to-be-analyzed packet 12 with the content of the whitelist 10 corresponding to the protocol port. How the abnormal packet detection apparatus 1 uses the whitelist 10 to determine whether the to-be-analyzed packet 12 is abnormal will be detailed in the following description.

Specifically, the to-be-analyzed packet 12 has a packet length (which is referred to as "current packet length") and records a source address (which is referred to as "current source address"). The processor 15 determines whether the current packet length and the current source address of the to-be-analyzed packet 12 are respectively the same as the legal packet length and the legal source address comprised in a certain record among the legal packet records 10a, . . . , 10b. If the processor 15 determines that no legal packet record in the whitelist 10 whose legal packet length and legal source address are respectively the same as the current packet length and the current source address of the to-be-analyzed packet 12, the processor 15 determines that the to-be-analyzed packet 12 is an abnormal packet and the transceiving interface 13 will transmit an alarm signal 20 accordingly. If the processor 15 determines that the current packet length and the current source address of the to-be-analyzed packet 12 are respectively the same as the legal packet length and the legal source address comprised in a certain record (which is referred to as "reference packet record") among the legal packet records 10a, . . . , 10b, the processor 15 will further analyze whether the to-be-analyzed packet 12 is abnormal from the current variation position of the to-be-analyzed packet 12.

How the processor 15 analyzes the current variation position of the to-be-analyzed packet 12 to determine whether the to-be-analyzed packet 12 is abnormal will be described now. Here, it is assumed that the processor 15 finds out a reference packet record (e.g., the legal packet record 10a) from the whitelist 10, of which the legal packet length and the legal source address are respectively the same as the current packet length and the current source address of the to-be-analyzed packet 12. The processor 15 further compares the to-be-analyzed packet 12 with the reference packet corresponding to the reference packet record and thereby determine the current variation position (not shown) of the to-be-analyzed packet 12. Specifically, each of the to-be-analyzed packet 12 and the reference packet comprises a plurality of byte positions, and the processor 15 compares the to-be-analyzed packet 12 and the reference packet to find out the byte position(s) that has/have different values, and the byte position(s) having different values is the one or more current variation positions of the to-be-analyzed packet 12. Then, the processor 15 generates a first detection result by comparing each current variation position of the to-be-analyzed packet 12 with the legal variation position set comprised in the reference packet record.

In some cases (depending on the content of the to-be-analyzed packet 12), the first detection result is that a certain current variation position of the to-be-analyzed packet 12 is not one of the at least one byte position comprised in the legal variation position set included in the reference packet record. For example, if the reference packet record is the legal packet record 10a and the current variation position of the to-be-analyzed packet 12 is the $50^{th}$ byte position, the current variation position is not one of the byte positions comprised in the legal variation position set included in the reference packet record (i.e., it is neither the $49^{th}$ byte position nor the $54^{th}$ byte position). According to such a first detection result, the processor 15 will regard the to-beanalyzed packet 12 as an abnormal packet, and the transceiving interface 13 will transmit an alarm signal 20 accordingly.

In some cases (depending on the content of the to-be-analyzed packet 12), the first detection result is that each current variation position of the to-be-analyzed packet 12 is one of the at least one byte position comprised in the legal variation position set included in the reference packet record. For example, if the reference packet record is the legal packet record 10a and the only current variation position of the to-be-analyzed packet 12 is the $49^{th}$ byte position, the current variation position is one of the byte positions comprised in the legal variation position set included in the reference packet record. According to such a first detection result, the processor 15 will further analyze the current occurrence value of the to-be-analyzed packet 12 at the current variation position to determine whether the to-be-analyzed packet 12 is abnormal.

How the processor 15 analyzes the current occurrence value of the to-be-analyzed packet 12 at the current variation position to determine whether the to-be-analyzed packet 12 is abnormal will be described now. For convenience of subsequent explanation, it is assumed that the to-be-analyzed packet 12 has only one current variation position. It shall be appreciated that if the to-be-analyzed packet 12 has multiple current variation positions, the processor 15 will analyze each of the current variation positions of the to-be-analyzed packet 12 individually. Specifically, the processor 15 finds out a reference occurrence value set from at least one legal occurrence value set comprised in the reference packet record according to the current variation position of the to-be-analyzed packet 12. The reference occurrence value set comprises a plurality of legal occurrence values. The processor 15 then generates a second detection result by comparing the current occurrence value of the to-be-analyzed packet 12 at the current variation position with the reference occurrence value set.

In some cases (depending on the content of the to-be-analyzed packet 12), the second detection result is that the current occurrence value of the to-be-analyzed packet 12 at the current variation position is not one of the legal occurrence values comprised in the reference occurrence value set. For example, if the reference packet record is the legal packet record 10a, the current variation position of the to-be-analyzed packet 12 is the $49^{th}$ byte position, and the current occurrence value of the current variation position is 35, the processor 15 finds out a reference occurrence value set (i.e. {115, 139}) according to the current variation position and determines that the current occurrence value is not one of the legal occurrence values comprised in the reference occurrence value set. According to such a second detection result, the processor 15 will regard the to-be-analyzed packet 12 as an abnormal packet, and the transceiving interface 13 will transmit an alarm signal 20 accordingly.

In some cases (depending on the content of the to-be-analyzed packet 12), the second detection result is that the current occurrence value of the to-be-analyzed packet 12 at the current variation position is one of the legal occurrence values comprised in the reference occurrence value set. For example, if the reference packet record is the legal packet record 10a, the only current variation position of the to-be-analyzed packet 12 is the $49^{th}$ byte position, and the current occurrence value of the current variation position is 115, the processor 15 finds out a reference occurrence value set (i.e. {115, 139}) according to the current variation position and determines that the current occurrence value is one of the legal occurrence values comprised in the reference occurrence value set. According to such a second detection result, the processor 15 will regard the to-be-analyzed packet 12 as a normal packet.

As mentioned above, in some embodiments, each legal packet record comprised in a whitelist may comprise no legal occurrence value set. In these embodiments, the processor 15 will not analyze whether the to-be-analyzed packet 12 is abnormal from the aspect of the current occurrence value of the to-be-analyzed packet 12 at the current variation position.

In some embodiments, one or some legal packet records in the whitelist 10 respectively correspond to an occurrence pattern (not shown). In these embodiments, the abnormal packet detection apparatus 1 may further determine whether a plurality of to-be-analyzed packets (e.g., to-be-analyzed packets 14b, . . . , 14b, 12) occurring sequentially conform to the corresponding occurrence pattern and thereby determine whether there is an abnormal packet.

For convenience of subsequent explanation, it is assumed that the legal packet record 10a in the whitelist 10 corresponds to an occurrence pattern. Specifically, one of the at least one byte position comprised in the legal variation position set included in the legal packet record 10a is a special byte position (e.g., the byte position whose corresponding legal occurrence value set has the largest number of legal occurrence values) and the legal occurrence values comprised in the specific legal occurrence value set (which is one of the legal occurrence value sets comprised in the legal packet record 10a) corresponding to the specific byte position form an occurrence pattern. For example, the specific byte position of the legal packet record 10a is the $54^{th}$ byte position, and the legal occurrence values comprised in the specific legal occurrence value set corresponding to this specific byte position will occur in the order of 9, 10, 5, and 8. The storage 11 records the occurrence pattern of the legal packet record 10a at this specific byte position.

Here, it is assumed that the transceiving interface 13 receives the to-be-analyzed packets 14a, . . . , 14b, and 12 in sequence. The processor 15 determines that the current packet length and the current source address of each of the to-be-analyzed packets 14a, . . . , 14b and 12 are respectively the same as the legal packet length and the legal source address of the reference packet record (e.g., the legal packet record 10a). The processor 15 further generates another detection result by comparing a plurality of current occurrence values of the to-be-analyzed packets 14a, . . . , 14b and 12 at the specific byte position (e.g., the $54^{th}$ byte position) with the occurrence pattern. If the current occurrence values of the to-be-analyzed packets 14a, . . . , 14b and 12 at the specific byte position are inconsistent with the occurrence pattern, the processor 15 determines that some of the to-be-analyzed packets 14a, . . . , 14b and 12 is/are abnormal (e.g., the last one in the to-be-analyzed packets 14a, . . . , 14b and 12 is an abnormal packet) therein, and the transceiving interface 13 transmits an alarm signal 20 accordingly. If the current occurrence values of the to-be-analyzed packets 14a, . . . , 14b and 12 at the specific byte position are consistent with the occurrence pattern, then processor 15 determines that there is no abnormal condition.

With the aforementioned operations, the abnormal packet detection apparatus 1 accomplishes determining whether any packet in the network environment is abnormal from aspects such as packet length, source address, variation position, occurrence value of variation position, and occurrence pattern.

In this embodiment, the abnormal packet detection apparatus 1 generates a whitelist 10 and then uses the whitelist 10 to detect abnormal packets. In other embodiments, the abnormal packet detection apparatus 1 may use the whitelist 10 generated by other apparatuses with the same technology. How the abnormal packet detection apparatus 1 generates the whitelist 10 will be described in detail below.

In this embodiment, the storage 11 further stores a plurality of historical packets 22a, . . . , 22b of the same protocol port (e.g., the protocol port using the port number of 44818). Each of the historical packets 22a, . . . , 22b has a historical packet length and records a historical source address. The processor 15 generates a piece of statistical data for the historical packets with different historical packet lengths, wherein each of the pieces of statistical data comprises the corresponding historical packet length, one or more of the historical source addresses, a count related to the corresponding historical packet length, at least one historical variation position, and at least one historical occurrence value of each of the at least one historical variation position. The processor 15 further generates one of the legal packet records according to each of the pieces of statistical data.

Figure 1C:
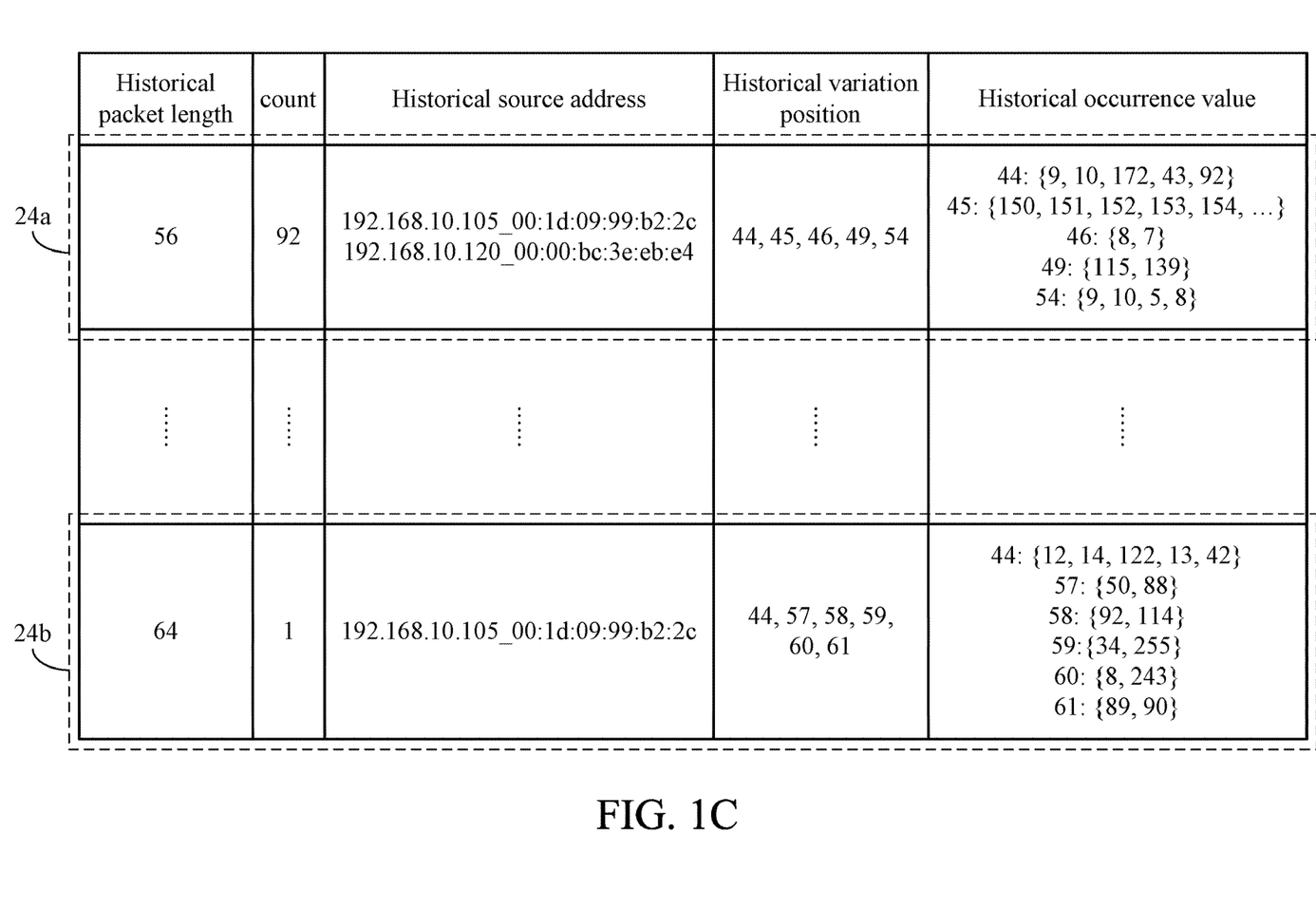
FIG. 1C depicts a specific example of generating statistical data 24a, . . . , 24b for historical packets with different historical packet lengths.

For comprehension, please refer to a specific example shown in FIG. 1C. This specific example will be used for the subsequent description and is not intended to limit the scope of the present invention. In the specific example shown in FIG. 1C, the processor 15 generates statistical data 24a, . . . , 24b for the historical packets with different historical packet lengths. Taking the statistical data 24a as an example, it comprises the corresponding historical packet length (i.e., 56), the historical source addresses of those historical packets with a historical packet length of 56 bytes, a count of historical packets with the historical packet length of 56 bytes (e.g., the number of historical packets with the historical packet length of 56 bytes, the number of times of comparing the historical packets with the historical packet length of 56 bytes to a reference packet), a plurality of historical variation positions (i.e., among the historical packets with the historical packet length of 56 bytes, the byte positions whose values had changed), and at least one historical occurrence value of each historical variation position (i.e., the value that had occurred in each historical variation position).

In some embodiments, the processor 15 may analyze the contents of the historical packets 22a, . . . , 22b one by one to generate and update the statistics data 24a, . . . , 24b. If the historical packet length of the historical packet analyzed by the processor 15 occurs for the first time, the processor 15 sets the historical packet as the reference packet corresponding to the historical packet length (the historical packet may also be regarded as the reference packet corresponding to the statistical data corresponding to the historical packet length) and increases the count of the statistical data corresponding to the historical packet length by 1. If the historical packet length of the historical packet analyzed by the processor 15 does not occur for the first time, the processor 15 increases the count of the historical packet by 1, compares the historical packet with the corresponding reference packet to determine whether any byte position(s) corresponds to different values, records the value of the byte position(s) (if any) as the historical variation position of the statistical data corresponding to the historical packet length, and records the value of the byte position(s) (if any) as the historical occurrence value of the statistical data corresponding to the historical packet length.

One or some pieces of statistical data among a plurality of pieces of statistical data generated by the processor 15 according to the historical packets 22a, . . . , 22b may correspond to multiple historical source addresses (for example, the statistical data 24a shown in FIG. 1C). In some embodiments, in order to avoid the case where one or some pieces of statistical data correspond to multiple historical source addresses, the processor 15 may generate a piece of statistical data individually for a plurality of combinations formed by different historical packet lengths and different historical source addresses (for example, the historical packet length 56 and the historical source address 192.168.10.105_00:1d:09:99:b2:2c form one combination, while the historical packet length 56 and the historical source address 192.168.10.120_00:00:bc:3e:eb:e4 form another combination). Each of the combinations corresponds to a subset of the historical packets 22a, . . . , 22b, each of the pieces of statistical data generated by the processor 15 comprises the historical packet length, the historical source address, a count, at least one historical variation position, and at least one historical occurrence value of each of the at least one historical variation position related to the historical packets comprised in the subset, and this will not be further described herein.

After the processor 15 generates a plurality of pieces of statistical data (e.g., the statistical data 24a, . . . , 24b of FIG. 1C) according to the historical packets 22a, . . . , 22b, the processor 15 may further determine whether one or some specific byte positions occur in the historical variation position corresponding to each of the pieces of statistical data. If the determination result is yes, it means that the value of the specific byte position(s) is variable regardless of the packet length and, thus, it is unnecessary to pay attention to whether the value of the specific byte position(s) varies. Therefore, if the processor 15 determines that one or some specific byte positions occur in the historical variation position corresponding to each of the pieces of statistical data, the processor 15 further removes the specific byte position(s) from the historical variation position corresponding to each of the pieces of statistical data. In the specific example shown in FIG. 1C, the $44^{th}$ byte position occurs in the historical variation position corresponding to each of the statistical data 24a, . . . , 24b, so the processor 15 removes the $44^{th}$ byte position from the historical variation position corresponding to each of the statistical data 24a, . . . , 24b.

In this embodiment, the processor 15 further determines whether a variation rate of a specific byte position in the at least one historical variation position comprised in a certain piece of specific statistical data among the pieces of statistical data is higher than a threshold value. For example, the variation rate may be the ratio between the number of historical occurrence values corresponding to the specific byte position of the specific statistical data and the count of the specific statistical data. If the determination result is yes, it means that the value of the specific byte position is variable for the historical packet length recorded by the specific statistical data. Thus, it is unnecessary to pay special attention to whether the value of the specific byte position varies. Therefore, if the determination result is yes, the processor 15 will remove the corresponding specific byte position from the at least one historical variation position of the specific statistical data. In the specific example shown in FIG. 1C, it is assumed that the historical occurrence value of the $45^{th}$ byte position of the statistical data 24a is 92 in total, the processor 15 determines that the variation rate of the $45^{th}$ byte position of the statistical data 24a is higher than a threshold and then removes the $45^{th}$ byte position from the historical variation positions corresponding to the statistical data 24a. It shall be appreciated that, in other embodiments, the processor 15 may omit the determination regarding the variation rate of a specific byte position.

In this embodiment, for the specific byte position whose corresponding variation rate is higher than the threshold, the processor 15 may determine whether the historical occurrence values corresponding to the specific byte position are ascending. If the determination result is yes, the processor 15 further determines whether the next byte position of the specific byte position also belongs to the historical variation position and whether the historical occurrence values corresponding to the next byte position are also ascending. If the determination result is yes, the processor 15 determines that the next byte position and the specific byte position should be viewed together, and the two byte positions correspond to a variable value (e.g., time). Thus, the processor 15 removes the next byte position from the at least one historical variation position of the specific statistical data. In the specific example shown in FIG. 1C, the processor 15 determines that the historical occurrence values at the $45^{th}$ byte position are ascending and, thus, further determines that the $46^{th}$ byte position is also one of the historical variation positions of the statistical data 24a and the historical occurrence values corresponding to the $46^{th}$ byte position are also ascending. Therefore, the processor 15 further removes the $46^{th}$ byte position from the historical variation positions corresponding to the statistical data 24a. It shall be noted that, in other embodiments, the processor 15 may omit the determination described above for the next byte position of a specific byte position.

Figure 1D:
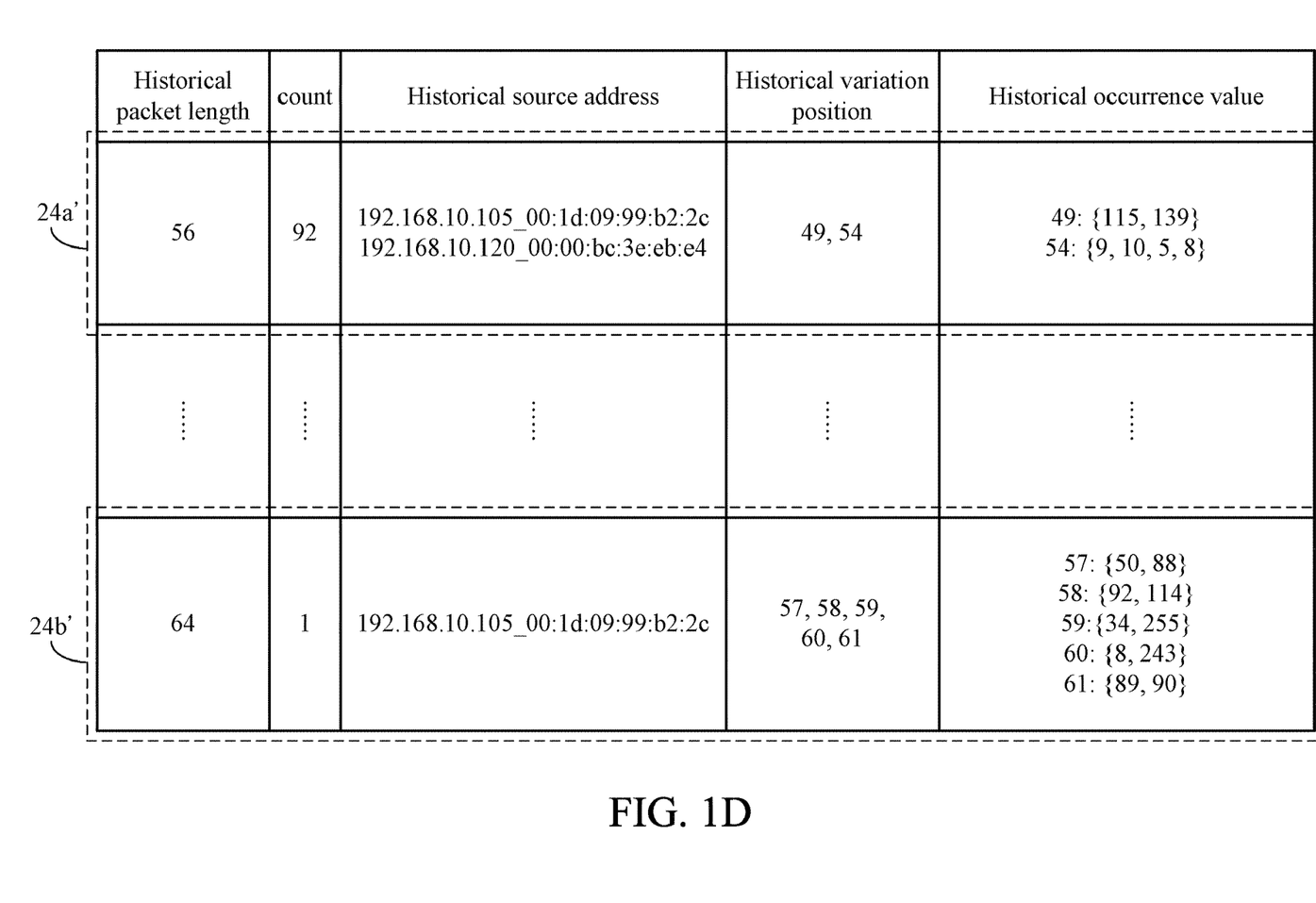
FIG. 1D depicts a specific example of removing some historical variation positions from the statistical data.

For comprehension, please refer to the specific example shown in FIG. 1C. If the processor 15 performs various processing described above on the statistical data 24a, . . . , 24b shown in FIG. 1C, the statistical data 24a', . . . , 24b' as shown in FIG. 1D will be obtained.

In this embodiment, the processor 15 may further use the statistical data 24a, . . . , 24b (or using the statistical data 24a', . . . , 24b') to find out the master device in the network environment. Specifically, in a network environment, a master device usually corresponds to fewer packet lengths and a slave device usually corresponds to more packet lengths. Therefore, the processor 15 may further determine whether a packet length variation of a certain (or some) specific source address(es) in the historical source addresses is smaller than a threshold value from the statistical data 24a, . . . , 24b (or the statistical data 24a', . . . , 24b') and determines that the specific source address(es) whose corresponding packet length variation is smaller than the threshold value individually corresponds/correspond to a master device. The purpose of finding out the master device will be explained later. It shall be noted that, in some embodiments, if the processor 15 does not need to identify the master device in the network environment, it is unnecessary to perform the related operations.

In this embodiment, after the processor 15 analyzes the historical variation positions of the pieces of statistical data and removes the historical variation positions that do not need to be considered from the pieces of statistical data, the processor 15 may generate the legal packet records 10a, . . . , 10b in the whitelist 10 according to these statistical data.

In some embodiments, the processor 15 may focus on one, some, or all pieces of the statistical data. If each piece of focused statistical data corresponds to only one historical source address, the processor 15 generates a legal packet record individually for each piece of locked statistical data. Specifically, the historical packet length, the historical source address, the historical variation position, and the at least one historical occurrence value of each of the historical variation positions of a piece of statistical data are respectively the legal packet length, the legal source address, the legal variation position, and the at least one legal occurrence value of each of the legal variation positions in a legal packet record.

Figure 1E:
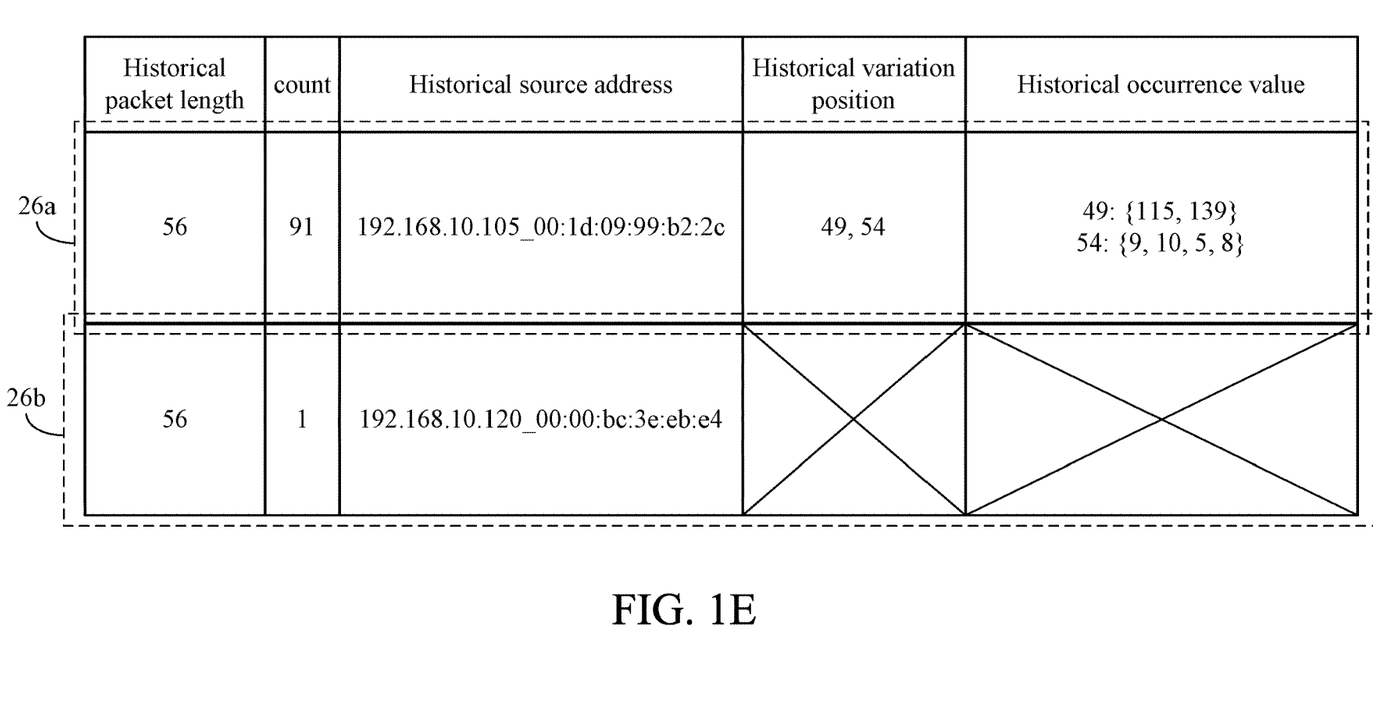
FIG. 1E depicts a specific example of re-generating statistical data 26a and 26b for a target packet length.

In some embodiments, the processor 15 may identify a target packet length from the historical packet lengths according to the maximum of the counts of the statistical data 24a', . . . , 24b'. For the specific examples shown in FIG. 1C and FIG. 1D, the processor 15 identifies that the target packet length is 56, because the corresponding count is the largest. The processor 15 then generates a piece of second statistical data individually for at least one combination formed by the target packet length and different historical source addresses. Each of the at least one combination corresponds to a subset of the historical packets, and each of the at least one piece of second statistical data comprises the target packet length, one of the historical source addresses, a count related to the historical packets comprised in the subset, at least one second historical variation position, and at least one second historical occurrence value of each of the at least one second historical variation position. For the specific examples shown in FIG. 1C and FIG. 1D, the processor 15 will generate two pieces of statistical data 26a and 26b as shown in FIG. 1E because the historical packet length of 56 bytes corresponds to two different historical source addresses. Then, the processor 15 generates the legal packet records in the whitelist 10 according to the statistical data 26a and 26b. For example, the statistical data 26a correspond to the master device, and the processor 15 generates a legal packet record in the whitelist 10 according to the statistical data 26a.

In this embodiment, the processor 15 may further analyze the statistical data corresponding to the master device. Taking the statistical data 26a as an example, the processor 15 analyzes the historical packets with the historical packet length of 56 and the historical source address of 192.168.10.105_00:1d:09:99:b2:2c. If the historical occurrence values of these historical packets at a certain specific historical variation position form an occurrence pattern, the processor 15 will record that the specific historical variation position of this piece of statistical data corresponds to the occurrence pattern. Therefore, when the processor 15 generates a legal packet record in the whitelist 10 according to the statistical data 26a, the legal packet record also records the occurrence pattern.

According to the above descriptions, the abnormal packet detection apparatus 1 may perform statistical analysis on historical packets of different protocol ports to generate whitelists of different protocol ports. The whitelist of a protocol port comprises at least one legal packet record, wherein each of the at least one legal packet record comprises a legal packet length, a legal source address, a legal variation position set, and at least one legal occurrence value set. After receiving a to-be-analyzed packet of a certain protocol port, the abnormal packet detection apparatus 1 may compare the to-be-analyzed packet with the whitelist of the protocol port and thereby determine whether the to-be-analyzed packet is abnormal from aspects such as the packet length, the source address, and the variation position, and even from the aspect of the occurrence value of the variation position.

The abnormal packet detection apparatus 1 performs statistical analysis on historical packets of different protocol ports to generate whitelists of different protocol ports. Since different communication protocols use different protocol ports, it means that the abnormal packet detection apparatus 1 performs statistical analysis on historical packets of different communication protocols to generate whitelists of different communication protocols. Even if there are unknown communication protocols, the user may use the abnormal packet detection apparatus 1 to generate corresponding whitelists to detect attack events in the network environment in time or/and instantly without understanding the contents of the unknown communication protocols.

Figure 2:
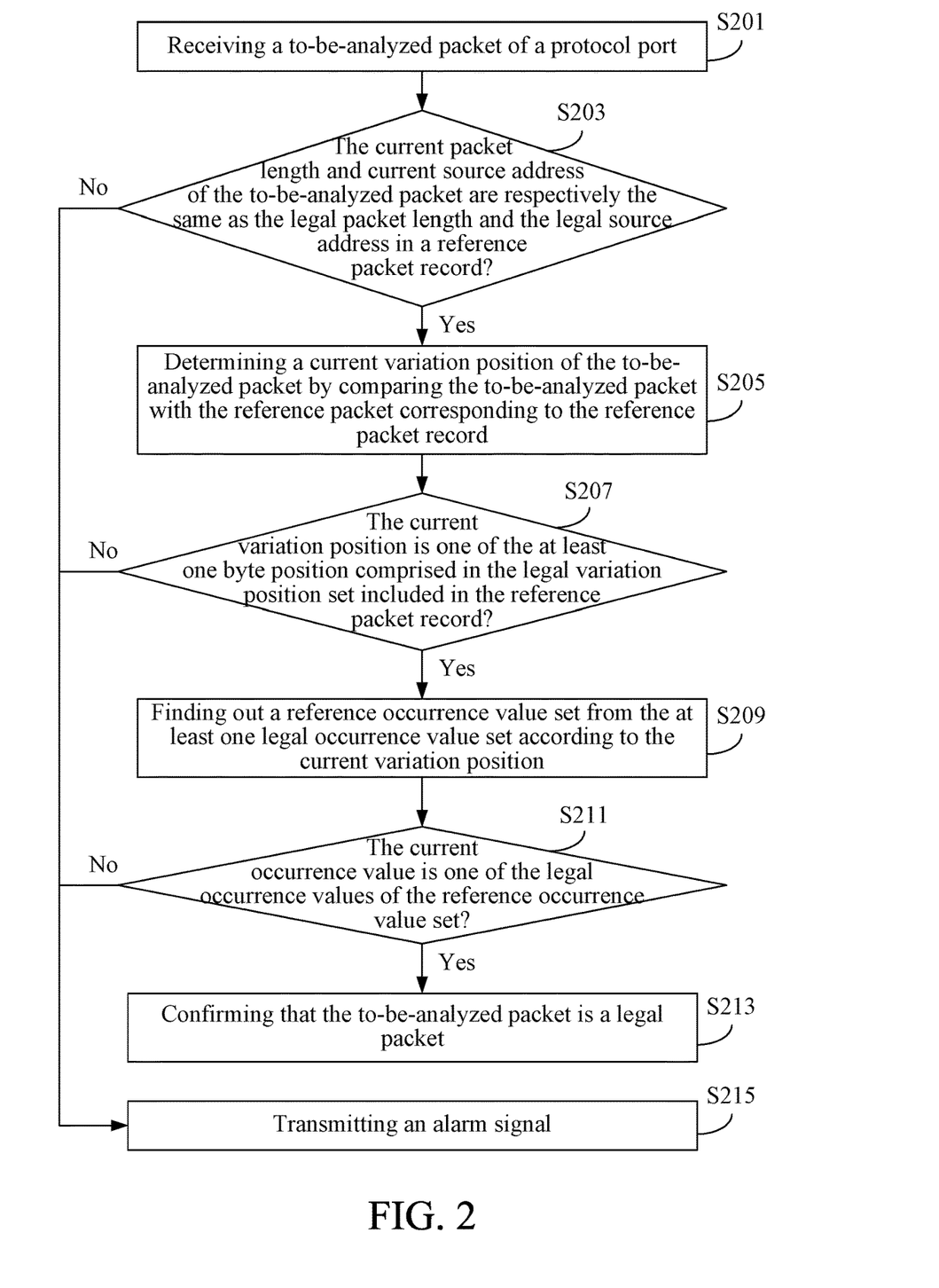
FIG. 2 depicts a main flowchart of an abnormal packet detection method according to the present invention.

A second embodiment of the present invention is an abnormal packet detection method, and a main flowchart thereof is depicted in FIG. 2. The abnormal packet detection method is adapted for use in an electronic computing apparatus, and the electronic computing apparatus stores a whitelist corresponding to a protocol port. The whitelist comprises at least one legal packet record, and each of the at least one legal packet record comprises a legal packet length, a legal source address, a legal variation position set, and at least one legal occurrence value set. Specifically, in a legal packet record, the legal variation position set comprises at least one byte position, each of the at least one byte position corresponds to a legal occurrence value set, and each legal occurrence value set comprises a plurality of legal occurrence values. Moreover, each of the at least one legal packet record corresponds to a reference packet. In this embodiment, the abnormal packet detection method comprises steps S201 to S215. By executing the steps S201 to S215, the purpose of determining whether a to-be-analyzed packet is abnormal from aspects such as the packet length, the source address, the variation position, and the occurrence value of the variation position is achieved.

In the step S201, the electronic computing apparatus receives a to-be-analyzed packet of the protocol port. Next, the electronic computing apparatus executes the step S203 to determine whether a current packet length and a current source address of the to-be-analyzed packet are respectively the same as the legal packet length and the legal source address comprised in a reference packet record among the at least one legal packet record. If the determination result of the step S203 is no, then the electronic computing apparatus executes the step S215 to transmit an alarm signal. If the determination result of the step S203 is yes, the electronic computing apparatus executes the step S205 to determine a current variation position of the to-be-analyzed packet by comparing the to-be-analyzed packet with the reference packet corresponding to the reference packet record.

Thereafter, in the step S207, the electronic computing apparatus generates a first detection result by comparing the current variation position with the legal variation position set comprised in the reference packet record. Specifically, the step S207 determines, by the electronic computing apparatus, whether the current variation position is one of the at least one byte position comprised in the legal variation position set included in the reference packet record. If the determination result of the step S207 is no (i.e., the first detection result is that the current variation position is not one of the at least one byte position comprised in the legal variation position set included in the reference packet record), the electronic computing apparatus executes the step S215 to transmit an alarm signal. If the determination result of the step S207 is yes (i.e., the first detection result is that the current variation position is one of the at least one byte position comprised in the legal variation position set included in the reference packet record), the electronic computing apparatus executes the step S209.

In the step S209, the electronic computing apparatus finds out a reference occurrence value set from the at least one legal occurrence value set according to the current variation position. Next, in the step S211, the electronic computing apparatus generates a second detection result by comparing a current occurrence value of the to-be-analyzed packet at the current variation position with the reference occurrence value set. Specifically, the step S211 determines whether the current occurrence value is one of the legal occurrence values of the reference occurrence value set. If the determination result of the step S211 is no (i.e., the second detection result is that the current occurrence value is not one of the legal occurrence values of the reference occurrence value set), the electronic computing apparatus executes the step S215 to transmit an alarm signal. If the determination result of the step S211 is yes (i.e., the second detection result is that the current occurrence value is one of the legal occurrence values of the reference occurrence value set), the electronic computing apparatus executes the step S213 to confirm that the to-be-analyzed packet is a legal packet.

It shall be noted that in some embodiments, the steps S209, S211, and S213 may be omitted if each legal packet record does not comprise a legal occurrence value set.

In some embodiments, the abnormal packet detection method may also determine whether a plurality of to-be-analyzed packets are abnormal according to whether the current occurrence values of the to-be-analyzed packets at a specific byte position conform to an occurrence pattern. In these embodiments, one or some legal packet records in the whitelist individually corresponds to an occurrence pattern. For convenience of subsequent explanation, it is assumed that the aforementioned reference packet record corresponds to an occurrence pattern. Specifically, a specific byte position in the legal variation position set of the reference packet record, whose corresponding specific occurrence value set comprises a plurality of legal occurrence values and these legal occurrence values form an occurrence pattern.

In these embodiments, if the abnormal packet detection method receives a plurality of to-be-analyzed packets and a current packet length and a current source address of each of the to-be-analyzed packets are respectively the same as the legal packet length and the legal source address comprised in the reference packet record, the abnormal packet detection method may further execute a step to generate another detection result by comparing a plurality of current occurrence values of the to-be-analyzed packets at the specific byte position with the occurrence pattern. If the current occurrence values of the to-be-analyzed packets at the specific byte position conform to the occurrence pattern, the abnormal packet detection method determines that there is no abnormal packet. If the current occurrence values of the to-be-analyzed packets at the specific byte position do not conform to the occurrence pattern, the abnormal packet detection method may further execute a step to transmit an alarm signal.

Figure 3:
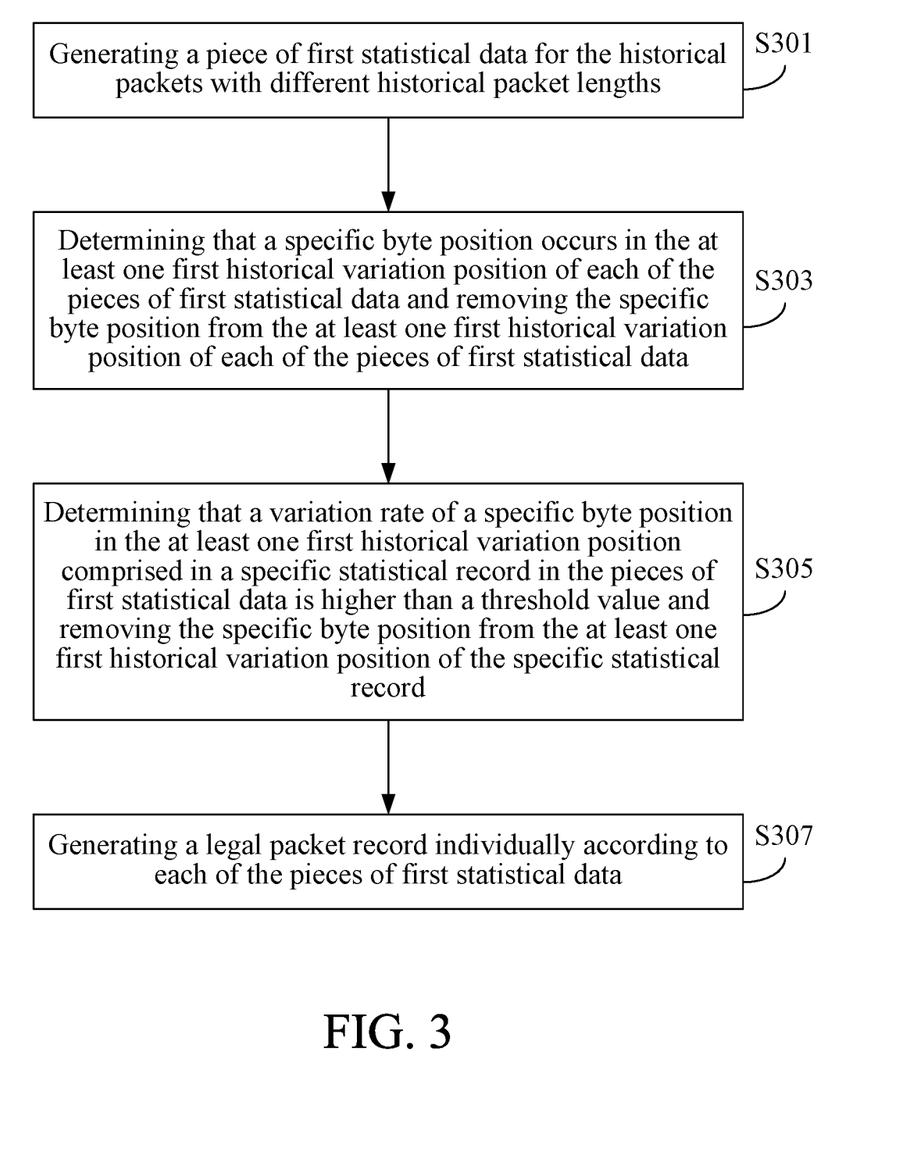
FIG. 3 depicts a flowchart of establishing a whitelist by an abnormal packet detection method according to the present invention.

In some embodiments, the abnormal packet detection method may further execute the process flow shown in FIG. 3 to establish a whitelist. In these embodiments, the electronic computing apparatus further stores a plurality of historical packets of the protocol port, and each of the historical packets has a historical packet length and records a historical source address. In these embodiments, the abnormal packet detection method further comprises steps S301 to S307.

At the step S301, the electronic computing apparatus generates a piece of first statistical data for the historical packets with different historical packet lengths, wherein each of the pieces of first statistical data comprises the corresponding historical packet length, one of the historical source addresses, a count related to the corresponding historical packet length, at least one first historical variation position, and at least one first historical occurrence value of each of the at least one first historical variation position.

In some embodiments, the step S301 may instead generate a piece of first statistical data individually for a plurality of combinations formed by different historical packet lengths and different historical source addresses. This may ensure that each piece of first statistic data only corresponds to one historical source address. Each of the aforementioned combinations corresponds to a subset of the historical packets, and each of the pieces of first statistical data comprises the historical packet length, the historical source address, a count, at least one first historical variation position, and at least one first historical occurrence value of each of the at least one first historical variation position related to the historical packets comprised in the subset.

At the step S303, the electronic computing apparatus determines that a specific byte position occurs in the at least one first historical variation position of each of the pieces of first statistical data and removes the specific byte position from the at least one first historical variation position of each of the pieces of first statistical data. It shall be noted that if no special byte position in the pieces of first statistical data occurs in the at least one first historical variation position of each of the pieces of first statistical data, the step S303 may be omitted.

At the step S305, the electronic computing apparatus determines that a variation rate of a specific byte position in the at least one first historical variation position comprised in a specific statistical record in the pieces of first statistical data is higher than a threshold value and then removes the specific byte position from the at least one first historical variation position of the specific statistical record. Similarly, if no specific byte position in the pieces of first statistical data has a variation rate higher than the threshold value, the step S305 may be omitted.

Then, the step S307 is executed to generate a legal packet record individually according to each of the pieces of first statistical data by the electronic computing apparatus.

In some embodiments, the abnormal packet detection method may further determine a master device from the pieces of statistical data. In these embodiments, the abnormal packet detection method executes a step for determining, from the pieces of statistical data, that a packet length variation of a specific source address among the historical source addresses is smaller than a threshold value. Thereafter, the abnormal packet detection method further executes a step for determining that the specific source address corresponds to a master device.

In some embodiments, the step S307 of the abnormal packet detection method may instead generate a legal packet record for a target packet length. In these embodiments, the abnormal packet detection method may execute a step to identify a target packet length from the historical packet lengths according to the maximum of the counts of the pieces of statistical data. The abnormal packet detection method further executes a step to generate a piece of second statistical data individually for at least one combination formed by the target packet length and different historical source addresses, wherein each of the at least one combination corresponds to a subset of the historical packets, and each of the at least one piece of second statistical data comprises the target packet length, one of the historical source addresses, a count related to the historical packets comprised in the subset, at least one second historical variation position, and at least one second historical occurrence value of each of the at least one second historical variation position. Then, the abnormal packet detection method further executes a step to generate the at least one legal packet record according to the at least one piece of second statistical data.

In addition to the aforesaid steps, the second embodiment can also execute all the operations and steps that can be executed by the abnormal packet detection apparatus 1, have the same functions, and deliver the same technical effects as the abnormal packet detection apparatus 1. How the second embodiment executes these operations and steps, has the same functions, and delivers the same technical effects as the abnormal packet detection apparatus 1 will be readily appreciated by a person having ordinary skill in the art based on the above explanation of the abnormal packet detection apparatus 1, and thus will not be further described herein.

It shall be noted that, in the specification and the claims of the present invention, some words (including to-be-analyzed packet, detection result, statistical data, historical variation position, and historical occurrence value) are preceded by terms such as "first" or "second," and these terms of "first" and "second" are only used to distinguish different words from each other. It shall be additionally noted that, in the specification and the claims of the present invention, some words (including packet record, packet length, source address, variation position set, occurrence value set, and occurrence value) are preceded by a term "legal," and the term is used to indicate that the data corresponding to the words is recorded in the whitelist. Furthermore, some words (including packet record, packet length, source address, variation position set, occurrence value set, and occurrence value) are preceded by a term "historical," and the term is used to indicate that the data corresponding to the words are past data. Additionally, some words (including packet length, source address, variation position and occurrence value) are preceded by a term "current," and the term is used to indicate that the data corresponding to the words is related to a to-be-analyzed packet.

According to the above descriptions, the abnormal packet detection technology (at least including the apparatus and the method) provided according to the present invention may perform statistical analysis on historical packets of different protocol ports to generate whitelists of different protocol ports. The whitelist of a protocol port comprises at least one legal packet record, and each of the at least one legal packet record comprises a legal packet length, a legal source address, a legal variation position set, and at least one legal occurrence value set. After receiving a to-be-analyzed packet from a certain protocol port, the abnormal packet detection technology provided by the present invention may compare the to-be-analyzed packet with the whitelist of the protocol port and thereby determine whether the to-be-analyzed packet is abnormal from aspects such as the packet length, the source address, and the variation position, and even from the aspect of the occurrence value of the variation position.

The abnormal packet detection technology provided according to the present invention performs statistical analysis on historical packets of different protocol ports to generate whitelists of different protocol ports. Since different communication protocols use different protocol ports, it means that the abnormal packet detection technology provided according to the present invention performs statistical analysis on historical packets of different communication protocols to generate whitelists of different communication protocols. Even if there are unknown communication protocols, the user may use the abnormal packet detection technology provided according to the present invention to generate corresponding whitelists to detect attack events in the network environment in time or/and instantly without understanding the contents of the unknown communication protocols.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An abnormal packet detection apparatus, comprising:
a storage, being configured to store a whitelist corresponding to a protocol port, wherein the whitelist comprises at least one legal packet record, each of the at least one legal packet record comprises a legal packet length, a legal source address, and a legal variation position set, and each of the at least one legal packet record corresponds to a reference packet;
a transceiving interface, being configured to receive a first to-be-analyzed packet of the protocol port; and
a processor, being electrically connected to the storage and the transceiving interface, and being configured to determine that a current packet length and a current source address of the first to-be-analyzed packet are respectively the same as the legal packet length and the legal source address comprised in a reference packet record among the at least one legal packet record, determine a current variation position of the first to-be-analyzed packet by comparing the first to-be-analyzed packet with the reference packet corresponding to the reference packet record, and generate a first detection result by comparing the current variation position with the legal variation position set comprised in the reference packet record,
wherein the whitelist comprises a plurality of legal packet records, the storage further stores a plurality of historical packets of the protocol port, each of the historical packets has a historical packet length and records a historical source address, the processor further generates a piece of statistical data individually for a plurality of combinations formed by different historical packet lengths and different historical source addresses, each of the combinations corresponds to a subset of the historical packets, each of the pieces of statistical data comprises the historical packet length, the historical source address, a count, at least one historical variation position, and at least one historical occurrence value of each of the at least one historical variation position related to the historical packets comprised in the subset, and the processor further generates one of the legal packet records according to each of the pieces of statistical data.

2. The abnormal packet detection apparatus of claim 1, wherein the legal variation position set of each of the at least one legal packet record comprises at least one byte position, wherein the first detection result is that the current variation position is not one of the at least one byte position comprised in the legal variation position set included in the reference packet record, and the transceiving interface further transmits an alarm signal.

3. The abnormal packet detection apparatus of claim 1, wherein the legal variation position set of each of the at least one legal packet record comprises at least one byte position, and each of the at least one byte position corresponds to a legal occurrence value set,
wherein the first detection result is that the current variation position is one of the at least one byte position comprised in the legal variation position set included in the reference packet record, the processor further finds out a reference occurrence value set from the at least one legal occurrence value set according to the current variation position, and the processor further generates a second detection result by comparing a current occurrence value of the first to-be-analyzed packet at the current variation position with the reference occurrence value set.

4. The abnormal packet detection apparatus of claim 3, wherein the reference occurrence value set comprises a plurality of legal occurrence values, the second detection result is that the current occurrence value is not one of the legal occurrence values, and the transceiving interface further transmits an alarm signal.

5. The abnormal packet detection apparatus of claim 1, wherein the legal variation position set of the reference packet record comprises at least one byte position, each of the at least one byte position corresponds to a legal occurrence value set, a specific byte position in the at least one byte position corresponds to a specific occurrence value set in the at least one legal occurrence value set, and a plurality of legal occurrence values comprised in the specific occurrence value set form an occurrence pattern,
wherein the transceiving interface further receives a plurality of second to-be-analyzed packets, the processor further determines that a current packet length and a current source address of each of the second to-be-analyzed packets are respectively the same as the legal packet length and the legal source address comprised in the reference packet record, and the processor further generates a second detection result by comparing a plurality of current occurrence values of the second to-be-analyzed packets and the first to-be-analyzed packet at the specific byte position with the occurrence pattern to generate a second detection result.

6. The abnormal packet detection apparatus of claim 1, wherein the whitelist comprises a plurality of legal packet records, the storage further stores a plurality of historical packets of the protocol port, each of the historical packets has a historical packet length and records a historical source address, the processor further generates a piece of statistical data for the historical packets with different historical packet lengths, each of the pieces of statistical data comprises the corresponding historical packet length, one of the historical source addresses, a count related to the corresponding historical packet length, at least one historical variation position and at least one historical occurrence value of each of the at least one historical variation position, and the processor further generates one of the legal packet records according to each of the pieces of statistical data.

7. The abnormal packet detection apparatus of claim 6, wherein the processor determines that a specific byte position occurs at the at least one historical variation position of each of the pieces of statistical data, and the processor further removes the specific byte position from the at least one historical variation position of each of the pieces of statistical data.

8. The abnormal packet detection apparatus of claim 6, wherein the processor further finds out a piece of specific statistical data from the pieces of statistical data, the processor further determines that a variation rate of a specific byte position in the at least one historical variation position comprised in the specific statistical data is higher than a threshold value, and the processor further removes the specific byte position from the at least one historical variation position of the specific statistical data.

9. The abnormal packet detection apparatus of claim 6, wherein the processor further determines, from the pieces of statistical data, that a packet length variation of a specific source address among the historical source addresses is smaller than a threshold value, and the processor further determines that the specific source address corresponds to a master device.

10. The abnormal packet detection apparatus of claim 1, wherein the processor further generates a piece of first statistical data for the historical packets with different historical packet lengths, and each of the pieces of first statistical data comprises the corresponding historical packet length, at least one of the historical source addresses, a count related to the corresponding historical packet length, at least one first historical variation position, and at least one first historical occurrence value of each of the at least one first historical variation position,
wherein the processor further identifies a target packet length from the historical packet lengths according to the maximum of the counts, the processor further generates a piece of second statistical data individually for at least one combination formed by the target packet length and different historical source addresses, each of the at least one combination corresponds to a subset of the historical packets, each of the at least one piece of second statistical data comprises the target packet length, one of the historical source addresses, a count related to the historical packets comprised in the subset, at least one second historical variation position, and at least one second historical occurrence value of each of the at least one second historical variation position, and the processor further generates the at least one legal packet record according to the at least one piece of second statistical data.

11. An abnormal packet detection method, being adapted for use in an electronic computing apparatus, the electronic computing apparatus storing a whitelist corresponding to a protocol port, the whitelist comprising at least one legal packet record, each of the at least one legal packet record comprising a legal packet length, a legal source address, and a legal variation position set, each of the at least one legal packet record corresponding to a reference packet, and the abnormal packet detection method comprising the following steps:
receiving a first to-be-analyzed packet of the protocol port;
determining that a current packet length and a current source address of the first to-be-analyzed packet are respectively the same as the legal packet length and the legal source address comprised in a reference packet record among the at least one legal packet record;
determining a current variation position of the first to-be-analyzed packet by comparing the first to-be-analyzed packet with the reference packet corresponding to the reference packet record; and
generating a first detection result by comparing the current variation position with the legal variation position set comprised in the reference packet record,
wherein the whitelist comprises a plurality of legal packet records, the electronic computing apparatus further stores a plurality of historical packets of the protocol port, each of the historical packets has a historical packet length and records a historical source address, and the abnormal packet detection method further comprises the following steps:
generating a piece of statistical data individually for a plurality of combinations formed by different historical packet lengths and different historical source addresses, wherein each of the combinations corresponds to a subset of the historical packets, each of the pieces of statistical data comprises the historical packet length, the historical source address, a count, at least one historical variation position, and at least one historical occurrence value of each of the at least one historical variation position related to the historical packets comprised in the subset; and
generating one of the legal packet records according to each of the pieces of statistical data.

12. The abnormal packet detection method of claim 11, wherein the legal variation position set of each of the at least one legal packet record comprises at least one byte position, the first detection result is that the current variation position is not one of the at least one byte position comprised in the legal variation position set included in the reference packet record, and the abnormal packet detection method further comprises the following step:
transmitting an alarm signal.

13. The abnormal packet detection method of claim 11, wherein the legal variation position set of each of the at least one legal packet record comprises at least one byte position, each of the at least one byte position corresponds to a legal occurrence value set, the first detection result is that the current variation position is one of the at least one byte position comprised in the legal variation position set included in the reference packet record, and the abnormal packet detection method further comprises the following steps:
finding out a reference occurrence value set from the at least one legal occurrence value set according to the current variation position; and
generating a second detection result by comparing a current occurrence value of the first to-be-analyzed packet at the current variation position with the reference occurrence value set.

14. The abnormal packet detection method of claim 13, wherein the reference occurrence value set comprises a plurality of legal occurrence values, the second detection result is that the current occurrence value is not one of the legal occurrence values, and the abnormal packet detection method further comprises the following step:
transmitting an alarm signal.

15. The abnormal packet detection method of claim 11, wherein the legal variation position set of the reference packet record comprises at least one byte position, each of the at least one byte position corresponds to a legal occurrence value set, a specific byte position in the at least one byte position corresponds to a specific occurrence value set in the at least one legal occurrence value set, a plurality of legal occurrence values comprised in the specific occurrence value set form an occurrence pattern, and the abnormal packet detection method further comprises the following steps:
receiving a plurality of second to-be-analyzed packets;
determining that a current packet length and a current source address of each of the second to-be-analyzed packets are respectively the same as the legal packet length and the legal source address comprised in the reference packet record; and generating a second detection result by comparing a plurality of current occurrence values of the second to-be-analyzed packets and the first to-be-analyzed packet at the specific byte position with the occurrence pattern.

16. The abnormal packet detection method of claim 11, wherein the whitelist comprises a plurality of legal packet records, the electronic computing apparatus further stores a plurality of historical packets of the protocol port, each of the historical packets has a historical packet length and records a historical source address, and the abnormal packet detection method further comprises the following steps:

generating a piece of statistical data for the historical packets with different historical packet lengths, wherein each of the pieces of statistical data comprises the corresponding historical packet length, one of the historical source addresses, a count related to the corresponding historical packet length, at least one historical variation position, and at least one historical occurrence value of each of the at least one historical variation position; and generating one of the legal packet records according to each of the pieces of statistical data.

17. The abnormal packet detection method of claim 16, further comprising the following steps:

determining that a specific byte position occurs at the at least one historical variation position of each of the pieces of statistical data; and removing the specific byte position from the at least one historical variation position of each of the pieces of statistical data.

18. The abnormal packet detection method of claim 16, further comprising the following steps:

finding out a piece of specific statistical data from the pieces of statistical data;

determining that a variation rate of a specific byte position in the at least one historical variation position comprised in the specific statistical data is higher than a threshold value; and removing the specific byte position from the at least one historical variation position of the specific statistical data.

19. The abnormal packet detection method of claim 16, further comprising the following steps:

determining, from the pieces of statistical data, that a packet length variation of a specific source address among the historical source addresses is smaller than a threshold value; and determining that the specific source address corresponds to a master device.

20. The abnormal packet detection method of claim 11, further comprising the following steps:

generating a piece of first statistical data for the historical packets with different historical packet lengths, wherein each of the pieces of first statistical data comprises the corresponding historical packet length, at least one of the historical source addresses, a count related to the corresponding historical packet length, at least one first historical variation position, and at least one first historical occurrence value of each of the at least one first historical variation position;

identifying a target packet length from the historical packet lengths according to the maximum of the counts;

generating a piece of second statistical data individually for at least one combination formed by the target packet length and different historical source addresses, wherein each of the at least one combination corresponds to a subset of the historical packets, each of the at least one piece of second statistical data comprises the target packet length, one of the historical source addresses, a count related to the historical packets comprised in the subset, at least one second historical variation position, and at least one second historical occurrence value of each of the at least one second historical variation position; and generating the at least one legal packet record according to the at least one piece of second statistical data.

* * * * *